(12) United States Patent
Abramovich et al.

(10) Patent No.: US 7,812,508 B2
(45) Date of Patent: Oct. 12, 2010

(54) POWER HARVESTING FROM RAILWAY; APPARATUS, SYSTEM AND METHOD

(75) Inventors: Haim Abramovich, Nesher (IL); Eugeny Harash, Haifa (IL); Charles Milgrom, Moshav Aminadav (IL); Uri Amit, Raanana (IL); Lucy Edery Azulay, Haifa (IL)

(73) Assignee: Innowattech Ltd., Haifa (IL)

( * ) Notice: Subject to any disclaimer, the term of this patent is extended or adjusted under 35 U.S.C. 154(b) by 0 days.

(21) Appl. No.: 12/195,670

(22) Filed: Aug. 21, 2008

(65) Prior Publication Data

US 2009/0195122 A1 Aug. 6, 2009

Related U.S. Application Data

(60) Provisional application No. 61/026,600, filed on Feb. 6, 2008.

(51) Int. Cl.
H02N 2/18 (2006.01)
(52) U.S. Cl. ............................................ 310/339
(58) Field of Classification Search ........... 310/339
See application file for complete search history.

(56) References Cited

U.S. PATENT DOCUMENTS

| 4,330,593 | A | * | 5/1982 | Shrout et al. | 428/407 |
|---|---|---|---|---|---|
| 4,412,148 | A | * | 10/1983 | Klicker et al. | 310/358 |
| 4,728,845 | A | * | 3/1988 | Haun et al. | 310/358 |
| 5,065,068 | A | * | 11/1991 | Oakley | 310/357 |
| 5,334,903 | A | * | 8/1994 | Smith | 310/358 |
| 5,796,207 | A | * | 8/1998 | Safari et al. | 310/358 |
| 5,818,149 | A | * | 10/1998 | Safari et al. | 310/358 |
| 5,825,386 | A | * | 10/1998 | Ohashi | 347/71 |
| 6,004,500 | A | * | 12/1999 | Safari et al. | 264/610 |
| 6,262,517 | B1 | * | 7/2001 | Schmidt et al. | 310/334 |
| 6,277,299 | B1 | * | 8/2001 | Seyed-Bolorforosh | 252/62.9 R |
| 7,112,267 | B2 | * | 9/2006 | Whatmore et al. | 204/547 |
| 7,160,500 | B2 | * | 1/2007 | Park et al. | 264/645 |
| 7,521,841 | B2 | * | 4/2009 | Clingman et al. | 310/339 |
| 2008/0074002 | A1 | * | 3/2008 | Priya et al. | 310/339 |
| 2009/0195124 | A1 | * | 8/2009 | Abramovich et al. | 310/339 |

FOREIGN PATENT DOCUMENTS

| JP | 10073073 | A | * | 3/1998 |
|---|---|---|---|---|
| JP | 2005353015 | A | * | 12/2005 |
| JP | 2006197704 | A | * | 7/2006 |
| JP | 2008019329 | A | * | 1/2008 |
| JP | 2008099489 | A | * | 4/2008 |

* cited by examiner

*Primary Examiner*—J. SanMartin
(74) *Attorney, Agent, or Firm*—William H. Dippert; Eckert Seamans Cherin & Mellott, LLC (57) ABSTRACT

The present invention relates to an apparatus system and method for power harvesting from a railroads using piezoelectric generator. The invention is to provide a system and a method for power harvesting comprising a plurality of piezoelectric devices embedded in a railroad sleeper or attached to railroad rails and configured to produce electrical power when a train traverses their locations. The system includes a power conditioning unit and electrical conductors connecting said piezoelectric to said power conditioning unit. Harvested energy may be used locally in proximity to the energy generation location, stored for later use or transferred to be used in remote location.

25 Claims, 6 Drawing Sheets

Fig. 1a (art)

(i) isometric view
(ii) cross section
(iii) vertical section

POWER HARVESTING FROM RAILWAY; APPARATUS, SYSTEM AND METHOD

The present invention claims priority from U.S. provisional patent application Ser. No. 61/026,600, filed Feb. 6, 2008 by Abramovich et al.

FIELD OF THE INVENTION

The present invention relates to an apparatus system and method for power harvesting from railways using piezoelectric generators.

BACKGROUND OF THE INVENTION

Piezoelectricity is the ability of certain crystalline materials to develop an electrical charge proportional to an applied mechanical stress. The converse effect can also be seen in these materials where strain is developed proportional to an applied electrical field. It was originally discovered by the Curie's in the 1880's. Today, piezoelectric materials for industrial applications are lead based ceramics available in a wide range of properties. Piezoelectric materials are the most well known active material typically used for transducers as well as in adaptive structures.

Virgin ceramic materials must be first poled to utilize their complete piezoelectric effect. Poling consists of applying a high electrical field to the material. During the poling process the crystal dipoles in the material are aligned with the applied electrical field and the material expands in the direction of the electrical field. By applying a field in the opposite direction, strain of opposite sign is observed. If the magnitude of this opposite field is increased, the material first depoles and finally repoles.

Poled piezoelectric material is considered transversely isotropic, i.e.: one plane is isotropic while the out-of-plane direction has different properties. The standard coordinate convention adopted by the IEEE [IEEE Standard on Piezoelectricity, 176-1978] assigns the 1-2 plane as the plane of symmetry and the 3-direction as the-out of-plane poling direction. For a small applied electrical field, the response of the piezoelectric ceramic can be modeled by the following linear piezoelectric constitutive [Jaffe, B., Cook Jr., W. R., and H. Jaffe, 1971, "Piezoelectric Ceramics", Academic Press] expressed in engineering matrix notation as:

$$\begin{Bmatrix} S \\ D \end{Bmatrix} = \begin{bmatrix} s^E & (d)^T \\ d & \varepsilon^T \end{bmatrix} \begin{Bmatrix} T \\ E \end{Bmatrix} \quad (1)$$

where D—electrical displacement, S—strain, E—electric field, T—stress, $\varepsilon^T$—constant stress (unclamped) dielectric, d—induced strain constant, $s^E$—constant field compliance.

Mechanical compression or tension on a poled piezoelectric ceramic element changes the dipole moment, creating a voltage. Compression along the direction of polarization, or tension perpendicular to the direction of polarization, generates voltage of the same polarity as the poling voltage. Tension along the direction of polarization, or compression perpendicular to the direction of polarization, generates a voltage with polarity opposite that of the poling voltage. These actions are generator actions—the ceramic element converts the mechanical energy of compression or tension into electrical energy. This behavior is used in fuel-igniting devices, solid state batteries, force-sensing devices, and other products. Values for compressive stress and the voltage (or field strength) generated by applying stress to a piezoelectric ceramic element are linearly proportional up to a material-specific stress. The same is true for applied voltage and generated strain.

If a voltage of the same polarity as the poling voltage is applied to a ceramic element, in the direction of the poling voltage, the element will lengthen and its diameter will become smaller. If a voltage of polarity opposite that of the poling voltage is applied, the element will become shorter and broader. If an alternating voltage is applied, the element will lengthen and shorten cyclically, at the frequency of the applied voltage. This is motor action—electrical energy is converted into mechanical energy. The principle is adapted to piezoelectric motors, sound or ultrasound generating devices, and many other products.

Figure 1A:
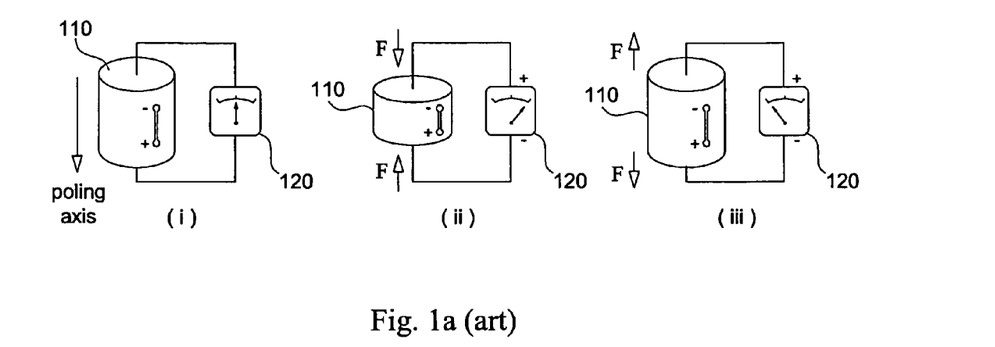
FIGS. 1a and 1b schematically depict the generator actions of a piezoelectric element as known in the art.

FIG. 1a. Schematically depicts the generator action of a piezoelectric element as known in the art.

The piezoelectric material has a considerable impact on the achievable performance of the transducer. Commonly used piezoelectric materials are based on lead zirconate titanate (PZT) ceramics.

Assuming that a PZT element is directly used as a transducer, the significant material parameters can be outlined to provide the material figure of merit. There are many factors that influence the selection of the PZT composition. The constitutive equations for a linear piezoelectric material under low stress (T) levels can be written as $$x = s^D T + g D \quad (2)$$

And $$E = -g T + \beta^X D \quad (3)$$

where x is the strain, D is the electric displacement, E is the electric field, s is the elastic compliance, and g is the piezoelectric voltage coefficient given as $$g = \frac{d}{\varepsilon_0 \varepsilon^X} \quad (4)$$

Here, d is the piezoelectric constant and $\in$ is the dielectric constant. The constant β in eq. (3) is the dielectric susceptibility, and is equal to the inverse dielectric permittivity tensor component. Under an applied force F=T·A, (where A is the area), the open circuit output voltage (U) of the ceramic can be computed from eq. (3), and is given as $$U = Et = -gTt = -\frac{gFt}{A} \quad (5)$$

where t is the thickness of the ceramic. The charge (Q) generated on the piezoelectric ceramic can be determined from eq. (2) and is given as $$D = \frac{Q}{A} = \frac{E}{\beta^X} = \frac{U \varepsilon_0 \varepsilon^X}{t} \quad (6)$$

or $$Q/U = \frac{\varepsilon^X \varepsilon_0 A}{t} = C \quad (7)$$

where C is the capacitance of the material. The above relationship shows that at low frequencies a piezoelectric plate can be assumed to behave like a parallel plate capacitor. Hence, the electric power available under the cyclic excitation is given by eq. (8) as follows.

$$P = \frac{1}{2}\frac{d^2}{\varepsilon_0 \varepsilon^X}F^2\frac{1}{A}fP = \frac{1}{2}CV^2 f = \frac{1}{2}(dg)T^2 Vf \quad (8)$$

where V=A×t is volume of the piezoelectric generator

Under certain experimental conditions, for a given material of fixed area and thickness, the electrical power is dependent on the $d^2/\varepsilon^X$ ratio of the material.

A material with a high $d^2/\varepsilon^X$ ratio will generate high power when the piezoelectric ceramic is directly employed for harvesting energy.

Figure 1B:
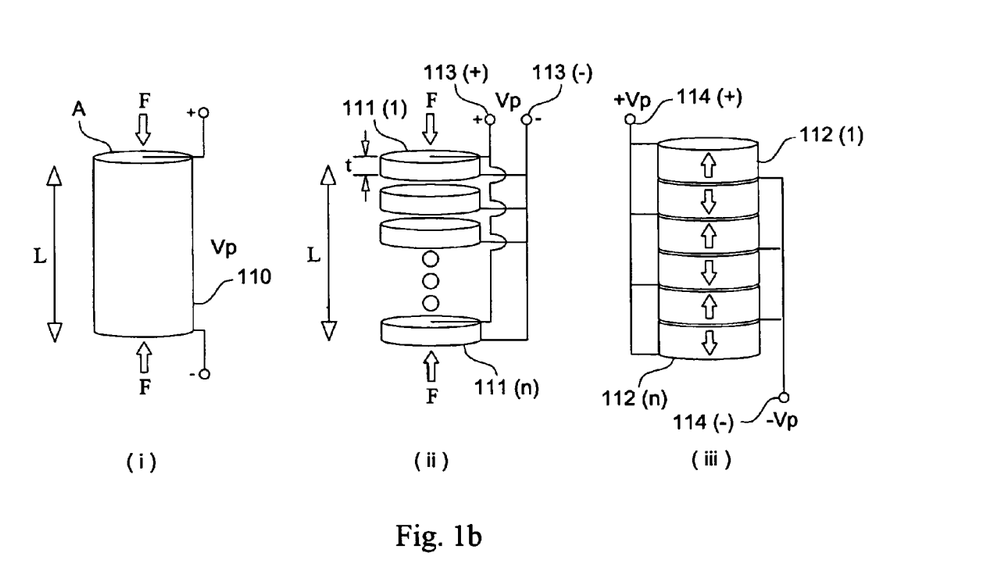

FIG. 1b(i) depicts the construction of a single element transducer and FIG. 1b(ii) depicts a multi-layered transducer.

In a multilayered construction of FIG. 1b(ii), the same force F is applied to all the layers. However, due to the smaller thickness of each layer, the voltage developed in each of the layer, (which is the voltage developed on the entire structure, as the layers are electrically connected in parallel) is lower. Electrically connecting all the layer in parallel increases the capacitance of the structure.

FIG. 1b(iii) depicts a preferred embodiment of a multilayer PZT generator wherein the polling directions of consecutive layers are reversed. In this embodiment, a common electrode is used between two, oppositely oriented layers.

The review article "Advances In Energy Harvesting Using Low Profile Piezoelectric Transducers"; by Shashank Priya; published in J Electroceram (2007) 19:165-182; provides a comprehensive coverage of the recent developments in the area of piezoelectric energy harvesting using low profile transducers and provides the results for various energy harvesting prototype devices. A brief discussion is also presented on the selection of the piezoelectric materials for on and off resonance applications.

The paper "On Low-Frequency Electric Power Generation With PZT Ceramics"; by Stephen R. Platt, Shane Farritor, and Hani Haider; published in IEEE/ASME Transactions On Mechatronics, VOL. 10, NO. 2, April 2005; discusses the potential application of PZT based generators for some remote applications such as in vivo sensors, embedded MEMS devices, and distributed networking. The paper points out that developing piezoelectric generators is challenging because of their poor source characteristics (high voltage, low current, high impedance) and relatively low power output.

The article "Energy Scavenging for Mobile and Wireless Electronics"; by Joseph A. Paradiso and Thad Starner; Published by the IEEE CS and IEEE ComSoc, 1536-1268/05/; reviews the field of energy harvesting for powering ubiquitously deployed sensor networks and mobile electronics and describers systems that can scavenge power from human activity or derive limited energy from ambient heat, light, radio, or vibrations.

In the review paper "A Review of Power Harvesting from Vibration using Piezoelectric Materials"; by Henry A. Sodano, Daniel J. Inman and Gyuhae Park; published in The Shock and Vibration Digest, Vol. 36, No. 3, May 2004 197-205, Sage Publications; discuses the process of acquiring the energy surrounding a system and converting it into usable electrical energy—termed power harvesting. The paper discuss the research that has been performed in the area of power harvesting and the future goals that must be achieved for power harvesting systems to find their way into everyday use.

Patent application WO07038157A2; titled "Energy Harvesting Using Frequency Rectification"; to Carman Gregory P. and Lee Dong G.; filed: Sep. 21, 2006 discloses an energy harvesting apparatus for use in electrical system, having inverse frequency rectifier structured to receive mechanical energy at frequency, where force causes transducer to be subjected to another frequency.

SUMMARY OF THE INVENTION

The present invention relates to an apparatus system and method for power harvesting railroads using piezoelectric generator.

It is an aspect of the current invention to provide a system for power harvesting comprising: a plurality of piezoelectric devices capable of producing electrical power; a power conditioning unit; and electrical conductors connecting said piezoelectric devices to said power conditioning unit; wherein said electrical power is generated when a train traverses their locations.

In some embodiments the piezoelectric devices are embedded in a sleeper.

In some embodiments the power conditioning unit supplies electrical power to battery charging station for charging batteries of electrical vehicles.

In some embodiments the power conditioning unit supplies electrical power to railroad station lights.

In some embodiments the power conditioning unit supplies electrical power to railroad traffic signaling unit.

In some embodiments the power conditioning unit is further connected to main power grid.

In some embodiments the power conditioning unit is further connected to a power storage unit.

In some embodiments the piezoelectric devices comprise plurality of PZT rods embedded in a elastic matrix.

In some embodiments the elastic matrix is a binder.

In some embodiments the elastic matrix is epoxy resin.

In some embodiments the matrix can be selected from a group of materials such as thermoplastic polymer, rubber, or other natural or synthetic resilient material.

In some embodiments the piezoelectric devices are attached to a railroad rail.

In some embodiments the piezoelectric devices are attached to the bottom of said railroad rail.

In some embodiments the piezoelectric devices are attached to the sides of the base of said railroad rail.

In some embodiments the piezoelectric devices are attached to the sides of the base of the crown of said railroad rail.

It is another aspect of the current invention to provide a method of harvesting energy comprising: embedding a plurality of piezoelectric devices capable of producing electrical power in a railroad sleepers; connecting power conditioning unit to said plurality of piezoelectric devices by electrical conductors; wherein electrical power is generated when a train traverses said piezoelectric devices locations.

It is another aspect of the current invention to provide a method of harvesting energy comprising: attaching a plurality of piezoelectric devices capable of producing electrical power to a railroad rail; connecting power conditioning unit to said plurality of piezoelectric devices by electrical conductors; wherein electrical power is generated when a train traverses said piezoelectric devices locations.

It should be noted that the terms "PZT transducer" and "Piezoelectric generator" are used interchangeably throughout this document.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention relates to an apparatus system and method for power harvesting from railways using piezoelectric generator.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The drawings are generally not to scale. Some optional parts were drawn using dashed lines.

For clarity, non-essential elements were omitted from some of the drawings.

As used herein, an element or step recited in the singular and proceeded with the word "a" or "an" should be understood as not excluding plural elements or steps, unless such exclusion is explicitly recited.

FIG. 1 schematically depicts the generator actions of a piezoelectric element as known in the art and as discussed in the background section.

FIG. 1a(i) depicts a PZT disk 110, showing its polling direction in the absence of external force. In this case, voltmeter 120 shows no generated charge.

FIG. 1a(ii) and 1a(ii) show the same PZT disk 110 with compression and extension forces applied to it respectively. In this case, voltmeter 120 shows positive and negative generated charge respectively.

FIG. 1b(i) depicts a single element PZT 110, similar to the one depicted in FIG. 1a. The length "L" of the element and its surface area "A" are marked in this figure.

FIG. 1b(ii) depicts a multilayer piezoceramic stack comprising n piezoceramic disks 111(1) to 111(n), each having substantially the same thickness t and surface area "A". In this case all the piezoceramic disks 111(1) to 111(n) are polled in the same direction, and all are electrically connected in parallel. Electrical insulator need to be inserted between contact electrodes of adjacent elements.

Charge output appears at the connectors 113(+) and 113(−). For convenience, we may refer to these connectors as "top electrode" and "bottom electrode" respectively.

FIG. 1b(iii) depicts a multilayer piezoceramic stack comprising n piezoceramic disks 112(1) to 112(n), each having substantially the same thickness and surface area. In this case all the piezoceramic disks 111(1) to 111(n) are polled in alternate direction as depicted by the arrows. Common electrodes are preferably used between faces of adjacent elements.

Charge output appears at the connectors 114(+) and 114(−). For convenience, we may refer to these connectors as "top electrode" and "bottom electrode" respectively.

Piezoelectric Generators

An important application area for piezoelectric ceramics is in the conversion of mechanical energy into electrical energy, and this chapter describes the conditions under which piezoceramic element should be used to convert the maximum amount of energy.

A piezoceramic cylinder can generate voltages that are high enough to draw a spark across an electrode gap, and such sparks can be used to ignite combustible gases in for instance cigarette lighters or gas stoves.

Figure 2:
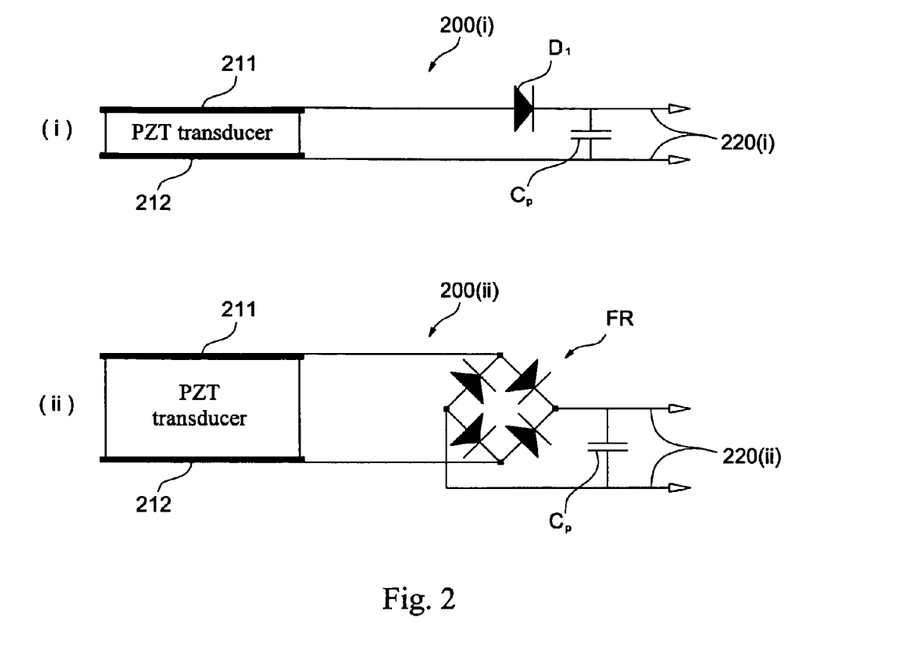
FIG. 2 schematically depicts apparatuses for electrical signal generation, rectification and storage.

Moreover, a part of the energy generated by a piezoceramic transducer can be stored in a capacitor and can be used to power a circuit as can be seen in FIG. 2.

In the generation and storage apparatuses depicted in FIG. 2, charge generated by the piezoelectric transducer is stored in the energy storage device such a capacitor. The rectifier, schematically depicted by diode $D_1$, holds the collected charge at the capacitor until it is utilized by the energy utilizing load.

FIG. 2(i) depicts a single diode rectifier, while FIG. 2(ii) shows a full rectifier comprising a four diodes bridge.

FIG. 2(i) depicts an energy harvesting system 200(i) using a single diode rectifier D1. Although the piezoceramic transducer in both FIGS. 2a and 2b appears as a single element having top electrode 211 and bottom electrode 212, the piezoceramic transducer may be a multi-element structure such as depicted in FIG. 1b(ii) or preferably as depicted in FIG. 1b(iii).

Rectifying diode D1 prevent electrical charge accumulated on capacitor Cρ from returning to the transducer once the load is removed from said transducer. Thus, the charge on capacitor Cρ remains until it is utilized by a load connected to load output 220(i).

FIG. 2(ii) depicts an energy harvesting system 200(ii) using a full rectifier comprising a four diodes bridge FR.

Rectifying bridge FR comprising four diodes directs charge generated by both compression and extention forces applied to the piezoceramic transducer to capacitor Cρ. Rectifying bridge FR prevent electrical charge accumulated on capacitor Cρ from returning to the transducer once the load is removed from said transducer. Thus, the charge on capacitor Cρ remains until it is utilized by a load connected to load output 220(ii), however, it is clear to see that system 200(ii) better utilizes the generated charge and thus has higher energy efficiency.

Figure 3:
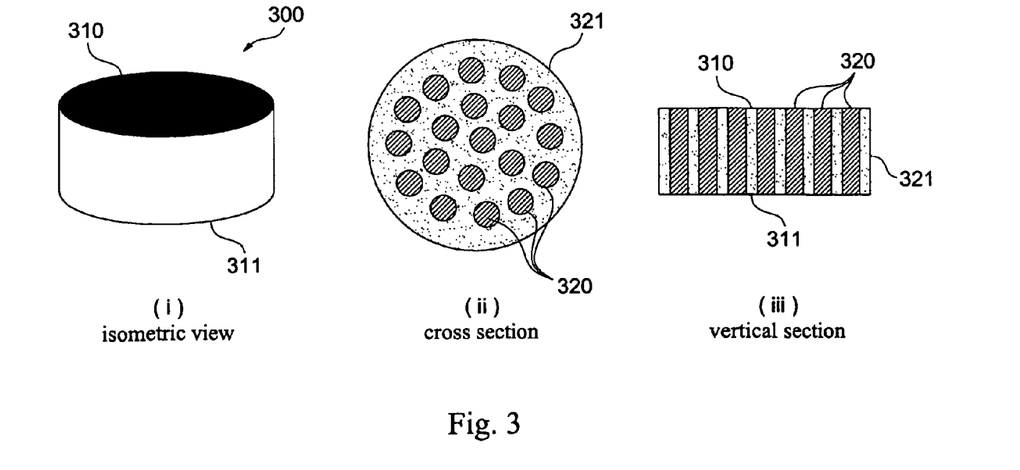
FIG. 3 schematically depicts a piezoelectric transducer according to an exemplary embodiment of the invention.

FIG. 3 schematically depicts a piezoelectric transducer according to an exemplary embodiment of the invention.

FIG. 3(i) depicts an isometric view of piezoelectric transducer 300 showing top electrode 310 and bottom electrode 311.

The composite disk made of piezoelectric rods 320 joined by epoxy or other binding resin 321 as schematically depicted in the cross section seen in FIG. 3(ii) and the vertical cross section seen in FIG. 3(iii). For example, binder may be a thermoplastic polymer, rubber or other natural or synthetic resilient material.

Each rode may be made of a single structure plurality of layers as seen in FIG. 1b(i), 1b(ii) or 1b(iii).

Preferably the electrodes of all the rods are connected n parallel to the top and bottom electrode as depicted in FIG. 3(iii).

It should be clear to the man of the art the circular shape of the transducer and rods, the rods' position and the aspect ratio of the transducer are for demonstration only and actual parameters are to be chosen according to the application taking into accounts requirements such as available space, load, etc.

Figure 4A:
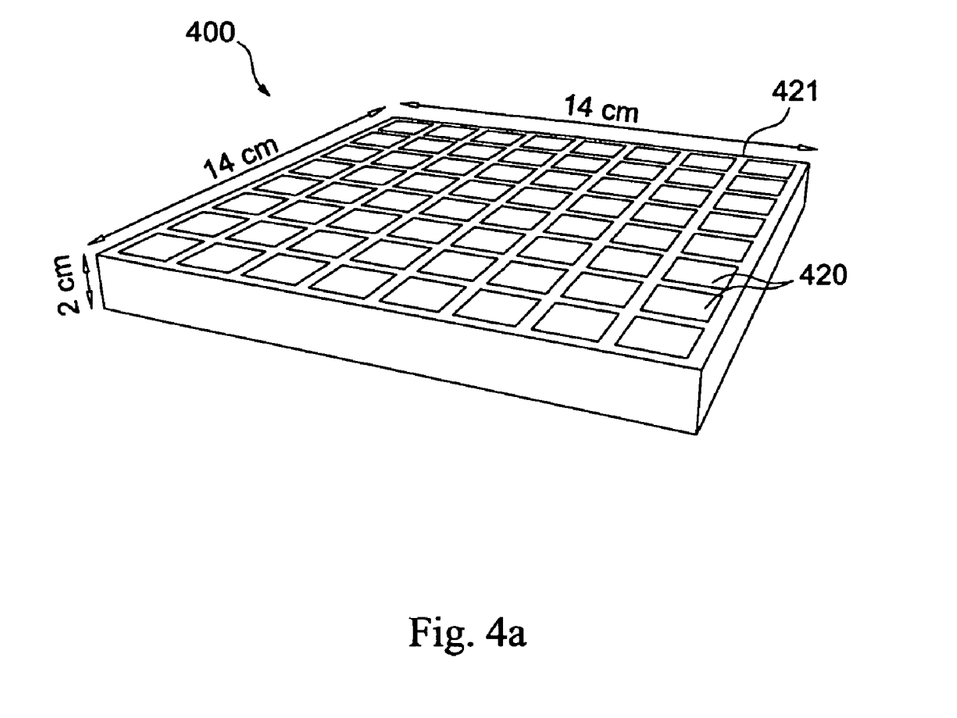
FIG. 4a schematically depicts a box shaped piezoelectric transducer according to a preferred embodiment of the invention.

FIG. 4a schematically depicts a box shaped piezoelectric transducer 400 according to a preferred embodiment of the invention.

The composite box made of piezoelectric rods 420 joined by epoxy or other binding resin 421 as schematically depicted in the figure.

Although the rods are depicted as having square cross section, cylindrical or other shapes may be used.

Typical dimensions for transducer 400 of 14×14 cm$^2$ and 2 cm height are given as example. In an embodiment of the invention, an array of 24×24 rods are used, each having dimensions of approximately 4×4 cm$^2$ and 2 cm height. For simplicity, only few of the rods are shown in this figure. Other shape and dimensions may be used. Rod dimensions, number, shape and array configuration may vary, and is optimized mainly for manufacturing cost minimization and energy generation efficiency.

Preferably, the ratio of active piezoelectric material to binder filing is approximately 50%. However, larger or smaller ratio may be used.

Typically, the matrix material is softer than the piezoelectric material.

Each rode may be made of a single structure or plurality of layers.

Preferably the electrodes of all the rods are connected n parallel to the top and bottom electrode (not seen in this figure).

In test apparatus, the ratio of active piezoelectric material to binder filing is approximately 64%. However, larger or smaller ratio may be used. Preferably, the matrix ratio is 30% to 40%.

In the small size test apparatus, an array of 8×8 (total 64) piezoelectric stacks was embedded in the matrix, wherein each stack is 4×4 mm and 20 mm high. However, the actual transducer to be used in railway application would preferably have dimensions comparable with the rail—sleeper connecting member. Thus, number of piezoelectric stacks and their size may be changed.

Typically, the matrix is softer than the piezoelectric material.

Each rod may be made of plurality of layers as known in the art. Preferably, each rod has a multilayer construction as depicted in FIG. 1b(iii). Preferably the electrodes of all the rods are connected n parallel to the top and bottom electrode (not seen in this figure).

In the tested apparatus, each PZT road is 20 mm high. Typically, polling voltage is in the order of 50,000 Volts per 1 cm. Using this polling technique would require 100,000 Volts which may leads to sparking and necessitate very high voltage source. According to the preferred embodiment of the invention, plurality of rods were connected in parallel and placed in an oven and heated to temperature close or preferably above the Curie temperature (approximately 300 degrees C. for the ceramic used). Polling voltage of only 10,000 to 15,000 V/cm (total of ~20,000 to 30,000V) was used. Preferably the rods were cooled to room temperature under the polling voltage. The rods were than integrated into the transducer structure by pouring the binder.

Figure 4B:
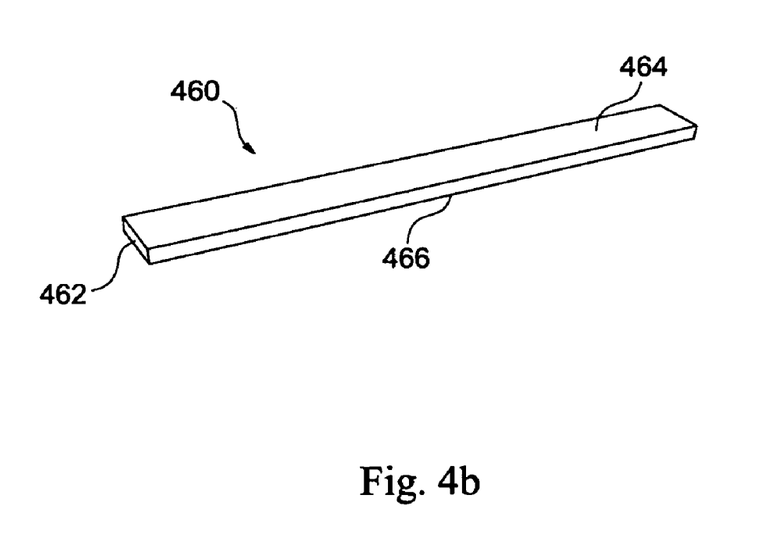
FIG. 4b schematically depicts an elongated PZT transducer according to another embodiment of the current invention.

FIG. 4b schematically depicts an elongated PZT transducer according to another embodiment of the current invention.

Elongated PZT transducer 460 comprises a thin strip of piezoelectric material 462. Top electrode 464 and bottom electrode 466 are deposited on the two opposing large faces of strip 462.

Optionally, the entire transducer 460 is encased in a protective cover. In this case, electric wires connected to top and bottom electrodes extend from the protective layer.

Optionally, only one of the two large faces is covered by the protective layer.

Preferably, transducer 460 is flexible and can conform to the shape of a train rail to which one of its large faces is to be glued.

Glue may be applied to the protective layer in the case wherein both large faces are protected. Alternatively, the unprotected large face is glued to the rail.

In some embodiment, conductive glue is used to glue at least some part of the unprotected electrodes, thus making electric contact between the rail and said unprotected electrode. In these embodiments, the rail is used as a common conductor for plurality of such transducers.

In other embodiments, in which both large faces are protected, wire connected to either top electrode 464 or bottom electrode 466 is electrically connected to said rail. In these embodiments, the rail is used as a common conductor for plurality of such transducers.

The piezoelectric material 462 is polled such that when transducer 460 is stretched along its long dimension or compressed, electric charge is generated and appears between top electrode 464 and bottom electrode 466.

Figure 6:
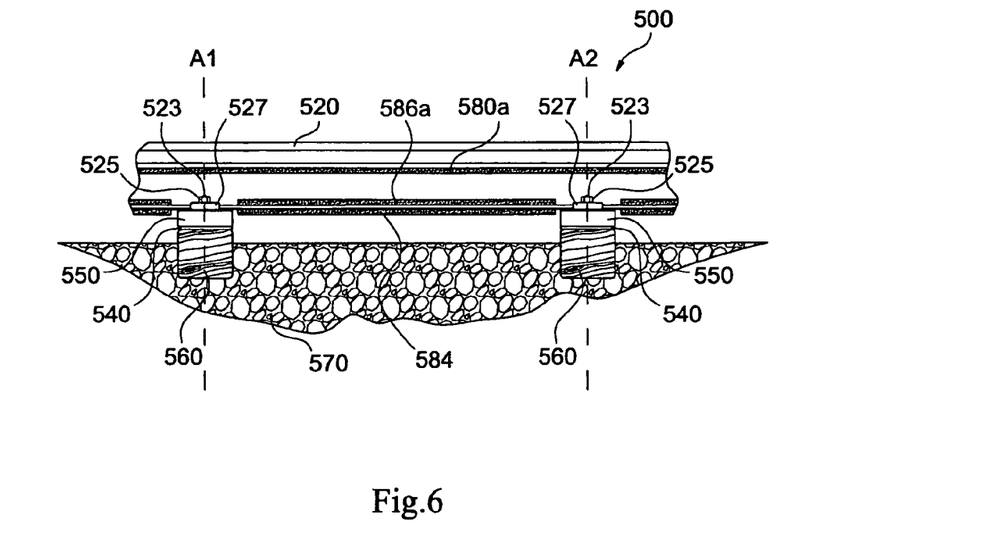
FIG. 6 schematically depicts a side view of an implementation of a system for energy harvesting according to an exemplary embodiment of the invention.
Figure 7:
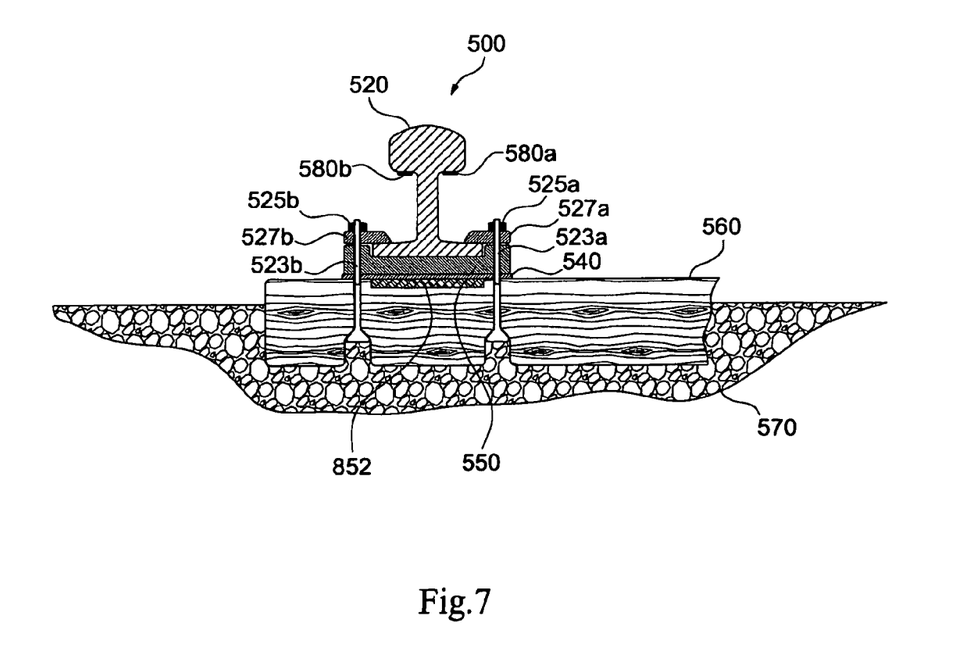
FIG. 7 schematically depicts a cross section of an implementation of energy harvesting system according an embodiment of the current invention.
Figure 8:
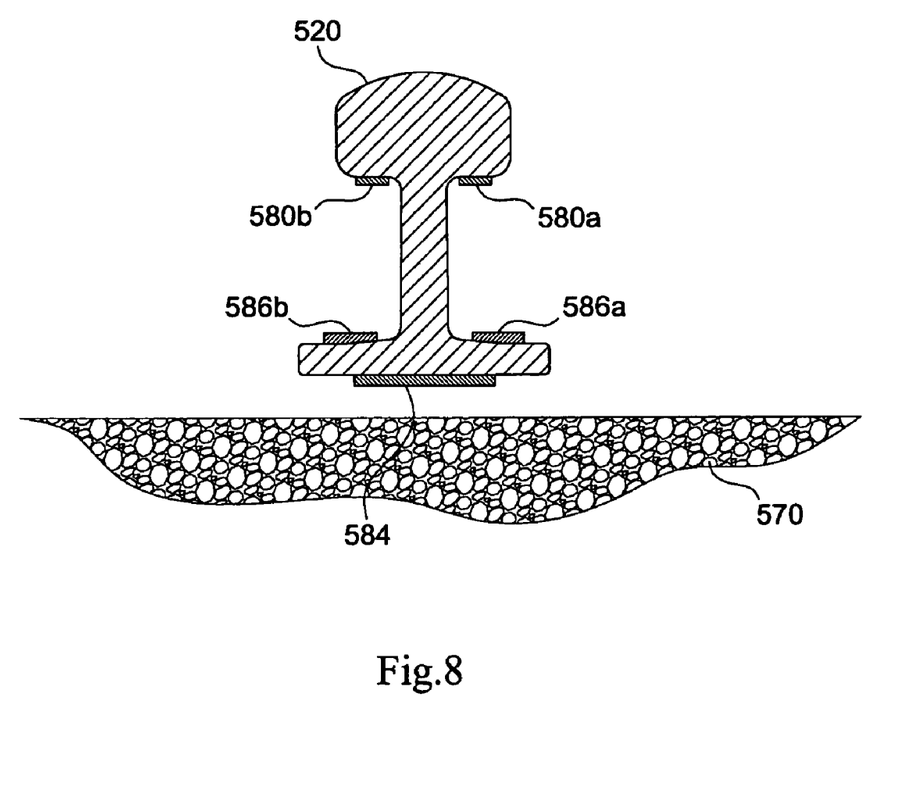
FIG. 8 schematically depicts another cross section of an implementation of energy harvesting system according to an embodiment of the current invention.

As will be seen in FIGS. 6, 7 and 8; Elongated PZT transducers similar to Elongated PZT transducer 460 are to be attached to the railroad rail in various places. The exact dimensions of Elongated PZT transducer 460 is thus depends on the place it is attached to. Generally, it is customary to produce Elongated PZT transducers with length of up to 50 cm, width of up to 20 cm and thickness of up to few mm. Narrow strips are sometimes cut from the large sheet of piezoelectric material.

Figure 5:
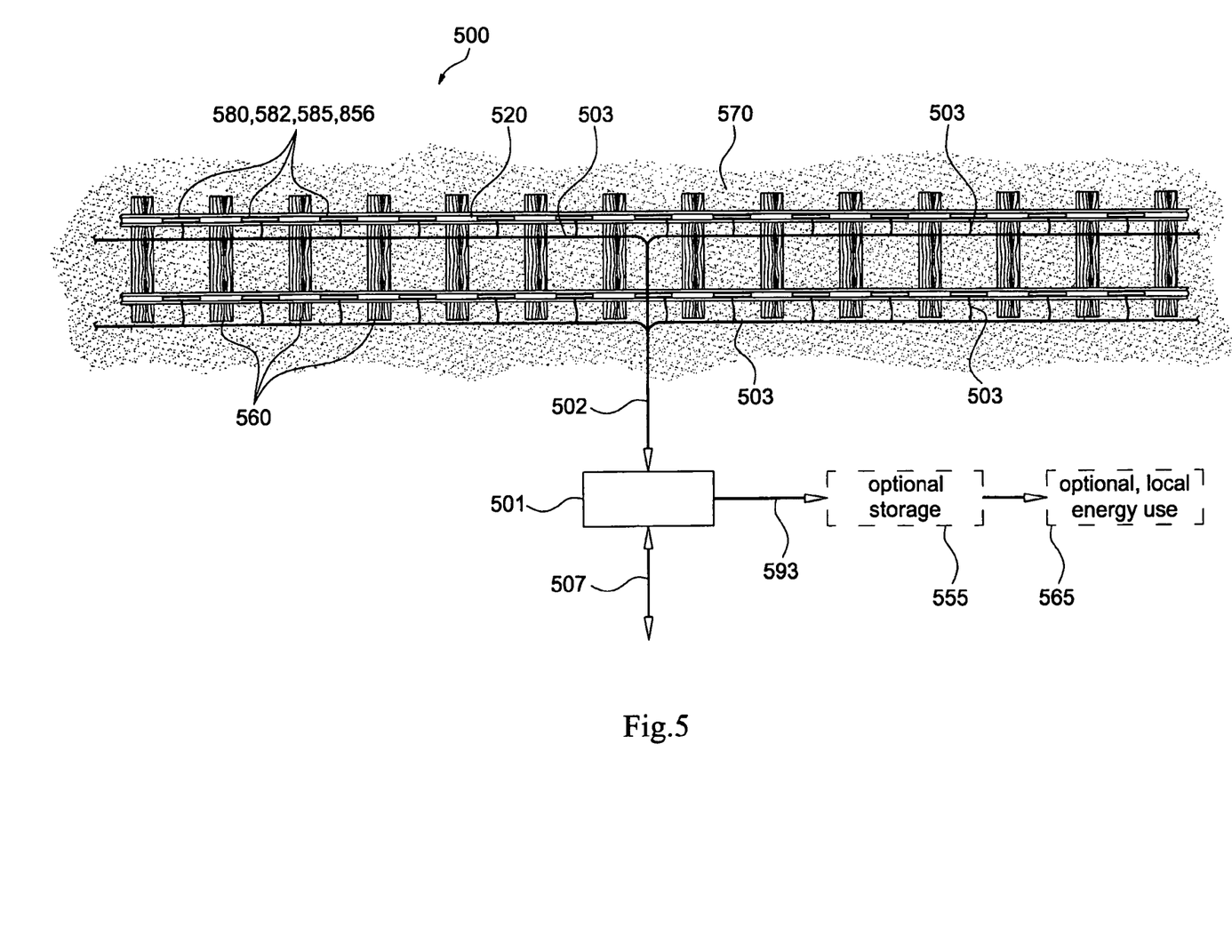
FIG. 5 schematically depicts a view of a system for power harvesting implemented on a railway according to an exemplary embodiment of the current invention.

FIG. 5 schematically depicts a top view of a system for power harvesting 500 implemented on a railway 505 according to an exemplary embodiment of the current invention.

In the depicted embodiments, a pluralities of energy generating devices (generally marked as 580, 582, 585 and 586) are attached to the rails 520 or to the sleepers 560 as will be depicted in the following figures.

Preferably, the energy generators 580, 582, 585 or 586 are piezoelectric transducer as depicted in FIG. 3 4a or 4b.

In the preferred embodiment, the energy generating devices are positioned at regular intervals associated with one and preferably both rails 520.

Electrical cables 503 connected to the energy generating devices, are used to transfer the generated energy to the energy management unit 501, optionally few cables 503 are joined to one feed cable 502 connected to said energy management unit 501. Conditioned energy is than transferred by cable 593 to energy utilizing system 565. Optionally, system 500 further comprises optional energy storage 555.

Energy is utilized by the energy utilization system 565. Optionally energy utilization system 565 is located in proximity to the energy management unit 501 and the optional energy storage 555.

For example:

Energy may be used for lighting train station at night. In this case, energy generated and stored during the day may be used at the following night when car traffic may be too small to provide the full power requirement.

Signaling lights and railroad-side signs may be powered, specifically, at remote and unpopulated locations and intersection where the cost of providing power using power lines from main power grid may be high. Other uses may be to power emergency communication units; mobile communication base stations and roadside advertisements.

As electric cars become popular, there is a growing need for roadside battery recharging stations. Power harvested from passing cars may be used.

Generated energy may be channeled back to power electric train, thus reducing electric power expenses and increasing efficiency. Specifically, harvested energy need not be transported far and may be used to power the same train that generated it.

In some embodiments, all the generated power, or extra power left over after local power demand was met, is exported to the main electrical power grid for a fee paid by electric company using optional connection 575. In these embodiments, energy management unit may convert the generated electrical power to high voltage used in the high tension power lines. In these embodiments, the optional main grid connection 507 may be used as backup power source to be used locally when traffic is thin.

In one embodiment, each cable 503 is made of two conductors and all the energy generating devices are connected in parallel. Alternatively, the energy generating devices are connected in series. Combination of parallel and series connection is also possible.

In some embodiments the rail 520 is used as one of the conductors. In these cases, feed cable 502 comprises a conductor connected to rail 520.

In some embodiments, electric rectification is done at each of the energy generating device, or at a group of energy generating devices and the rectified electric signal is transferred by a cable.

The energy management unit 501 may includes voltage conversion and regulation needed to convert the generated electric signal to useful form.

For example, the energy management unit 501 may comprise of DC to AC converter, converting the rectified generated signal to AC power ready to power devices designed to be powered by the usual household main power grid.

In the preferred embodiment, energy management unit 501 is positioned in the center of, and services a section of railroad, for example 1 km of railroad. It should be appreciate that optimization of the distance between energy generating devices and energy management units depends on the cost of cabling, cost of devices, energy loss in the cables, etc.

Preferably, the depicted power harvesting system is duplicated along the railroad for additional power harvesting.

It should be noted that the depicted example of implementation in one track railroad in this figure is for demonstration and simplicity only. The system may be used in a single or multilane track railroads.

FIG. 6 schematically depicts a side view of an implementation of a system 500 for energy harvesting according to an exemplary embodiment of the invention.

The side view depicted in FIG. 6, sows the sleepers 560 resting on gravel 570.

A thin elastic (rubber) layer 540 is preferably placed between sleeper 560 and mount 550. Washer 527, pressed down by screw 523 and nut 525, holds rail 520 to mount 550 and sleeper 560.

In this side view, locations of few possible locations for elongated piezoceramic transducers, such as depicted in FIG. 4b are depicted.

Optionally, elongated piezoceramic transducer 584 is glued or attached to the bottom face of rail 520. In this case, transducers 584 are short enough to fit in the gaps between adjacent sleepers 560.

Optionally, elongated piezoceramic transducers 586a and 586b (only one transducer, 586a is seen in this figure) are glued or attached to the right and left face respectively of the base of rail 520. In this case, transducers 586 are short enough to fit in the gaps between adjacent sleepers 560. Alternatively only one of elongated piezoceramic transducers 586a and 586b is used.

Optionally, elongated PZT transducers 580a and 580b (only one transducer, 580a is seen in this figure) are glued or attached to the right and left face respectively of the crown of rail 520. In this case, transducers 580 may be longer than gaps between adjacent sleepers 560. Alternatively only one of elongated piezoceramic transducers 580a and 580b is used.

The dashed lines A1 and A2 depict the locations of cross sections seen in FIG. 7 and FIG. 8 respectively.

FIG. 7 schematically depicts a cross section along the line A1 of an implementation of energy harvesting system according an embodiment of the current invention.

In this cross section, piezoceramic transducer 582 is seen placed in a recess in sleeper 560. Preferably piezoceramic transducer 582 is the type depicted in FIGS. 3 and 4a.

When a train traverses along rail 520, stress caused by the train's weight it transferred via rail 520, mount 550 and elastomeric layer 540 and presses on piezoceramic transducer 582 casing charge to be generated in said transducer.

Optional locations of elongated transducers 580a and 580b, at the base of the rail crown is also depicted in this figure.

In an exemplary embodiment, the current invention, the width of elongated transducers 580a and 580b is approximately 1.5 cm to fit in the relatively flat sections under the rail's crown. In an exemplary embodiment, the current invention, the length of elongated transducers 580a and 580b is determined by the maximum length of transducer that can be economically manufactured. Length of elongated transducers 580a and 580b may be larger than the gapes between sleepers. Optionally the rail is used as common electrode or as common conductor for plurality of transducers 580a and 580b.

When a train traverses the elongated transducers 580a and 580b, the rail deforms and bows down by the weight of the train, causing transducers 580a and 580b to stretch, thus casing charge to be generated in said transducers.

FIG. 8 schematically depicts another cross section along line A2, crossing a gap between sleepers, of an implementation of energy harvesting system according to an embodiment of the current invention.

Optionally, elongated piezoceramic transducer 584 is glued or attached to the bottom face of rail 520. In this case, transducers 584 are short enough to fit in the gaps between adjacent sleepers.

Optionally, elongated piezoceramic transducers 586a and 586b are glued or attached to the right and left face respectively of the base of rail 520. In this case, transducers 586 are short enough to fit in the gaps between adjacent sleepers 560. Alternatively only one of elongated piezoceramic transducers 586a and 586b is used.

In an exemplary embodiment, the current invention, the width of elongated transducer 584 is approximately 14 cm to fit in the relatively flat sections at the bottom of the rail. In an exemplary embodiment, the current invention, the length of elongated transducer 584 is determined by the free space between sleepers of approximately 30 cm.

FIG. 8 also show elongated transducers 580a and 580b, already seen in FIG. 7/

Optionally, elongated piezoceramic transducers 586a and 586b are glued or attached to the right and left face respectively of the base of rail 520. In this case, transducers 586 are preferably shorter than the gaps between adjacent sleepers. Alternatively only one of elongated piezoceramic transducers 586a and 586b is used.

In an exemplary embodiment, the current invention, the width of elongated transducer 586 is approximately 5 cm to fit in the relatively flat sections at the upper side of the base of the rail. In an exemplary embodiment, the current invention, the length of elongated transducer 586 is determined by the free space between sleepers of approximately 30 cm.

When a train traverses the elongated transducers the rail deforms and bows down by the weight of the train, causing transducers 580a, 580b and 584 to stretch, and causing 586a, 586b to contract; thus casing charge to be generated in said transducers.

It should be noted that energy may be generated not only by the stretching and pressing strain due to train travel, but also due to the noise and vibration caused by the passing train, as well at strain and stresses caused by temperature variation and vibration caused by a train traveling on a nearby track.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A system for power harvesting from railroad tracks having rail mounts and sleepers having each a recess, the system comprising:
   a matrix;
   a plurality of piezoelectric devices capable of producing electrical power, wherein said plurality of piezoelectric devices comprises a plurality of elongated piezoelectric rods embedded in the matrix;
   a power conditioning unit;
   electrical conductors connecting said plurality of piezoelectric devices to said power conditioning unit,
   wherein at least one of said plurality of piezoelectric devices is embedded in the recess in a sleeper, under a rail mount; and
   said plurality of piezoelectric rods is positioned within said plurality of piezoelectric devices such that a passing train produces compression stress along a longitudinal axis of said plurality of piezoelectric rods.

2. The system for power harvesting of claim 1, wherein the power conditioning unit is configured to supply electrical power to one or more of the group comprising: a battery charging station for charging batteries of electrical vehicles, railroad station lights, and railroad traffic signaling unit.

3. The system for power harvesting of claim 1 wherein the power conditioning unit is further connected to a main power grid and/or a power storage unit.

4. The system for power harvesting of claim 1 wherein said piezoelectric devices comprise a plurality of PZT rods embedded in a binder.

5. The system for power harvesting of claim 4, wherein said binder is epoxy resin.

6. The system for power harvesting of claim 4, wherein said binder is selected from a group of binders comprising: thermoplastic polymer, rubber, natural resilient material, and synthetic resilient material.

7. The system for power harvesting of claim 1 wherein said piezoelectric devices are attached to a railroad rail.

8. The system for power harvesting of claim 7, further comprising piezoelectric devices attached to at least one of the group comprising the bottom of said railroad rail, the base of said railroad rail, and the crown of said railroad rail.

9. The system for power harvesting of claim 7 wherein said railroad rail is used as one of the electrical conductors used for transmitting said harvested power.

10. The system for power harvesting of claim 1 wherein said matrix comprises a binder.

11. The system for power harvesting of claim 1, wherein said plurality of piezoelectric rods comprises multilayer piezoelectric stack.

12. The system for power harvesting of claim 11, wherein said at least one design parameter is selected from a group of parameters such as number of rods, length of rods, shape of rods, cross section of rods, aspect ratio of rods, position of rods, density of rods, and number of layers of rods in the piezoelectric stack.

13. The system for power harvesting of claim 1, wherein said plurality of piezoelectric devices has at least one design parameter that is selected according to an application requirement of said plurality of piezoelectric devices.

14. The system for power harvesting of claim 13, wherein said at least one design parameter is selected from a group of parameters such as number of rods, length of rods, shape of rods, cross section of rods, aspect ratio of rods, position of rods, and density of rods.

15. A method of harvesting energy from railroad tracks having sleepers comprising:
   embedding a plurality of piezoelectric devices capable of producing electrical power in recesses of the sleepers under the railroad track; and
   connecting a power conditioning unit to said plurality of piezoelectric devices by electrical conductors,
   wherein said plurality of piezoelectric devices comprises a plurality of elongated piezoelectric rods embedded in a matrix and positioned within said plurality of piezoelectric devices such that a passing train produces compression stress along a longitudinal axis of said plurality of piezoelectric rods.

16. The system for power harvesting of claim 13, wherein said application requirement comprises load.

17. The method for power harvesting of claim 15, wherein said matrix comprises a binder.

18. The method for power harvesting of claim 15, wherein said plurality of piezoelectric rods are positioned within said plurality of piezoelectric devices so that a passing train produces compression stress in said plurality of piezoelectric rods.

19. The method for power harvesting of claim 15, wherein said plurality of piezoelectric rods are positioned within said plurality of piezoelectric devices so that a passing train produces compression stress along a longitudinal axis of said plurality of piezoelectric rods.

20. The method for power harvesting of claim 15, wherein said plurality of piezoelectric devices has at least one design parameter that is selected according to an application requirement of said plurality of piezoelectric devices.

21. The method for power harvesting of claim 20, wherein said at least one design parameter is selected from one or more of a group of parameters comprising number of rods, length of rods, shape of rods, cross section of rods, aspect ratio of rods, position of rods, number of layers of rods in the piezoelectric stack, and density of rods.

22. The method for power harvesting of claim 20, wherein said application requirement comprises load.

23. A method of harvesting energy from railroad tracks comprising:
   attaching a plurality of piezoelectric devices capable of producing electrical power to a railroad rail wherein said plurality of piezoelectric devices comprise elongated piezoelectric elements positioned such that a passing train produces compression stress along a longitudinal axis of said plurality of piezoelectric elements; and
   connecting power conditioning unit to said plurality of piezoelectric devices by electrical conductors.

24. The method for power harvesting of claim 23, wherein said attaching said plurality of piezoelectric devices is selected from one or more of a group comprising to a bottom, to sides of a base and to sides of a base of a crown of said railroad tracks.

25. The method for power harvesting of claim 23, further comprising transmitting harvested power through said railroad tracks.

* * * * *